United States Patent [19]

Merko

[11] Patent Number: 5,746,404
[45] Date of Patent: May 5, 1998

[54] APPARATUS FOR COUNTERBALANCING EQUIPMENT

[76] Inventor: Andrew V. Merko, 1294 Sunny Oaks Cir., Altadena, Calif. 91001

[21] Appl. No.: 800,078

[22] Filed: Feb. 12, 1997

Related U.S. Application Data

[60] Provisional application No. 60/011,734, Feb. 15, 1996.
[51] Int. Cl.$^6$ .................................................. F16M 13/00
[52] U.S. Cl. .............................. 248/123.11; 248/280.11
[58] Field of Search .......................... 248/123.11, 280.11, 248/566, 162.1, 297.11, 575, 588, 595, 602; 108/37, 136; 267/73; 901/48; 396/428, 419

[56] References Cited

U.S. PATENT DOCUMENTS

| | | |
|---|---|---|
| 911,935 | 2/1909 | Baumwart . |
| 3,172,631 | 3/1965 | Borg ............................................ 248/201 |
| 3,219,303 | 11/1965 | Stryker ....................................... 248/280 |
| 3,749,342 | 7/1973 | Perrine ....................................... 248/123 |
| 3,883,105 | 5/1975 | Matsumoto ............................... 248/281 |
| 4,065,994 | 1/1978 | Streit .................................. 248/123.11 X |
| 4,165,530 | 8/1979 | Sowden ...................................... 362/401 |
| 4,166,602 | 9/1979 | Nilsen et al. ..................... 248/123.11 X |
| 4,213,591 | 7/1980 | Jaakkola ................................... 248/281.1 |
| 4,515,333 | 5/1985 | Pugh et al. .......................... 248/123.11 |
| 4,577,819 | 3/1986 | Bennett ................................... 248/133.1 |
| 4,621,796 | 11/1986 | Greenlee ........................ 248/123.11 X |
| 4,770,384 | 9/1988 | Kuwazima et al. ................. 248/281.1 |
| 4,883,249 | 11/1989 | Gurland ................................... 248/566 |
| 4,953,822 | 9/1990 | Sharber et al. ....................... 248/281.1 |
| 5,098,049 | 3/1992 | Vlaardingen ....................... 248/123.11 |
| 5,150,866 | 9/1992 | Karpisek ..................................... 248/79 |
| 5,253,832 | 10/1993 | Bolas et al. ......................... 248/123.11 |

OTHER PUBLICATIONS

Catalog Sinar Bron p. 58 "Flaming Stand".
Catalog Red Wing Red Wing Boom Creative Light Works.

*Primary Examiner*—Alvin C. Chin-Shue
*Assistant Examiner*—Long Dinh Phan
*Attorney, Agent, or Firm*—Norton R. Townsley

[57] ABSTRACT

An apparatus for counterbalancing equipment incorporating an internal spring counterbalancing mechanism housed inside a hollow vertical column. A pair of arms, pivotally attached to the column, and pivotally attached to a pair of L-brackets on the outer end, form a parallelogram. Equipment such as lights, cameras, industrial or medical devices, can be attached to a mounting platform at the L-brackets. The column is attached to a base equipped with lockable wheels.

Equipment of varying weights can be balanced by connecting a wire from the spring over a pulley, placed on top of the column, to a slidable connection on the parallelogram. By sliding the wire connection along the parallelogram, varying loads can be easily balanced. The hidden, internal spring-balancing mechanism, eliminates the need for cumbersome external counterweights, counter-boom extensions, or sand bags.

The parallelogram can be locked at any position with a clamping mechanism. When used as a camera stand, this feature prevents the camera from moving after the composition and focusing has been accomplished.

7 Claims, 5 Drawing Sheets

APPARATUS FOR COUNTERBALANCING EQUIPMENT

CROSS REFERENCE

This application claims the benefit of provisional application Ser. No. 60/011,734 filed Feb. 15, 1996.

BACKGROUND OF THE INVENTION

1. Field of the invention

The present invention relates to apparatus for counterbalancing equipment and more particularly to a system combining a stand and a boom arm with an internally housed spring/cable mechanism for counterbalancing.

2. Description of Prior Art

This apparatus is particularly suited for balancing cameras and lights in photography and video applications. In the trade this and similar equipment are referred to simply as a STAND and all references to this device will henceforth be referred to as a stand.

Adjustable support systems typically employed in a studio operations fall into the following main categories:

a) Tripod stands are typically made of three legs plus a center column, including variations with collapsible telescoping sections. These models typically position the camera or light directly over the center column.

b) Single column stands, also known as studio stands, comprising a hollow vertical column in which an internal deadweight, used for counterbalancing, travels vertically. A wire from the counterweight is looped over a pulley, mounted on the top of the column, and attached to a horizontal arm. The arm is fitted to a collar which surrounds the column and provides a slidable connection. A camera is typically attached to the end of the arm which traverses down the main column. This design is intended mainly as a camera stand.

c) Ceiling mounted light support systems which rely on scissor-type brackets for vertical adjustment, and rail brackets for horizontal adjustment. This type is not usually employed for camera support.

d) Boom arm stands are basically a two part system comprising of a boom and a separate stand. In this arrangement the counterbalance is achieved by placing a static weight on the opposite end of the boom, past the fulcrum point. The boom is typically used for supporting lights, microphones, and reflectors in a studio setting.

While some of the above mentioned models are used to support both cameras or lights, they face several shortcomings which the present invention overcomes.

In a typical tripod the light is mounted directly over the vertical column. This prevents the light from being pointed down at a sharp angle, a condition frequently desired in table-top photography. Since the tripod is usually made up of several short telescoping sections, for each of its three legs plus the center column, the raising or lowering of a light or a camera involves several cumbersome, time consuming steps. Because of the telescoping nature of the tripod, a certain minimum length must be maintained to house the telescoping sections of the tube. This makes it impossible to lower the equipment any closer to the floor than the longest telescoping section allows.

A single column studio stand is counterbalanced with a non-adjustable weight/pulley system similar to that used in a window sash. The weight is housed internally and connected to a cable via a pulley, located on top of the column. A vertically slidable cross arm is connected at the other end of the cable enabling the arm to vertically transverse with the attached equipment. Because the counterweight cannot be adjusted, and is not accessible, any weight variation of the camera or the light cannot be compensated. When the camera is lowered to its lowest position the heavy counterweight is raised to the maximum height, resulting in an undesirable, top heavy, configuration.

A ceiling mounted light support system hangs from suspended tracks. This device includes a complex array of rails and scissors and is typically restricted in its vertical travel. This system has no locking mechanism to prevent a camera vibration or drift, after focusing, and is generally used for supporting light-weight lights or reflectors.

A Boom arm is intended to support lights, microphones, and reflectors. The boom is usually mounted horizontally on top of a separate stand, where it is balanced, enabling the light to be pointed down at a sharp angle. While this is desirable in a small product or table-top photography, it has several drawbacks. In order to balance the weight of the equipment at the end of the boom, an equal or greater weight must be placed behind the fulcrum point on the opposite side of the stand, usually in a form of sand bags or other weights. As the boom arm is extended, the counterbalance section must also be extended or a much heavier counterweight must be employed. This added weight or length makes this arrangement either very heavy or excessively long. Moreover, the counterweight protruding beyond the fulcrum point prevents the use of this device next to a wall or other objects requiring a much larger floor space for its operation.

The development of a of camera/light support system having a boom arm with a stand; a locking mechanism for the boom arm; and an easily adjustable counter balancing mechanism for varying weights, represents a significant improvement in photography.

SUMMARY OF THE INVENTION

The present invention represents a great improvement in the field of camera and light support systems and satisfies the need of commercial and portrait photographers. The design works equally well as a camera or light platform for motion picture or video applications. Additional uses exist in the industrial and medical fields as adjustable support platforms for operating and examination lights, portable X-rays, and similar applications.

Accordingly, the purpose of this invention is to improve the design and operation of an equipment counterbalancing system having a boom arm and a stand; elimination of external counterweights; equipped with a locking mechanism and being capable of supporting cameras, lights, industrial and medical devices of different weights. Several objects and advantages of the present invention are:

(a) to provide the photographer an easily adjustable platform for cameras and lights;

(b) to enable the stand to be placed close to a wall or other objects, without interference from a cumbersome counter weight;

(c) to allow the camera or the light to be placed directly overhead of an item being photographed or illuminated;

(d) to enable the camera or light to maintain a parallel relationship to floor through a full range of vertical swing;

(e) to provide a mechanism for locking the parallelogram at a desired positon;

(f) to provide means for mounting a variety of cameras, lights, and accessories and (g) to eliminate external counterweights, enabling the stand to be placed against or near a wall or other objects thereby reducing the floor space needed for efficient operation.

An appreciation of the other aims and objectives of the present invention and a more complete and comprehensive understanding of it may be achieved by referring to the accompanying drawings and by studying the following description of the preferred embodiment.

DESCRIPTION OF PREFERRED EMBODIMENT

Figures 1, 2:
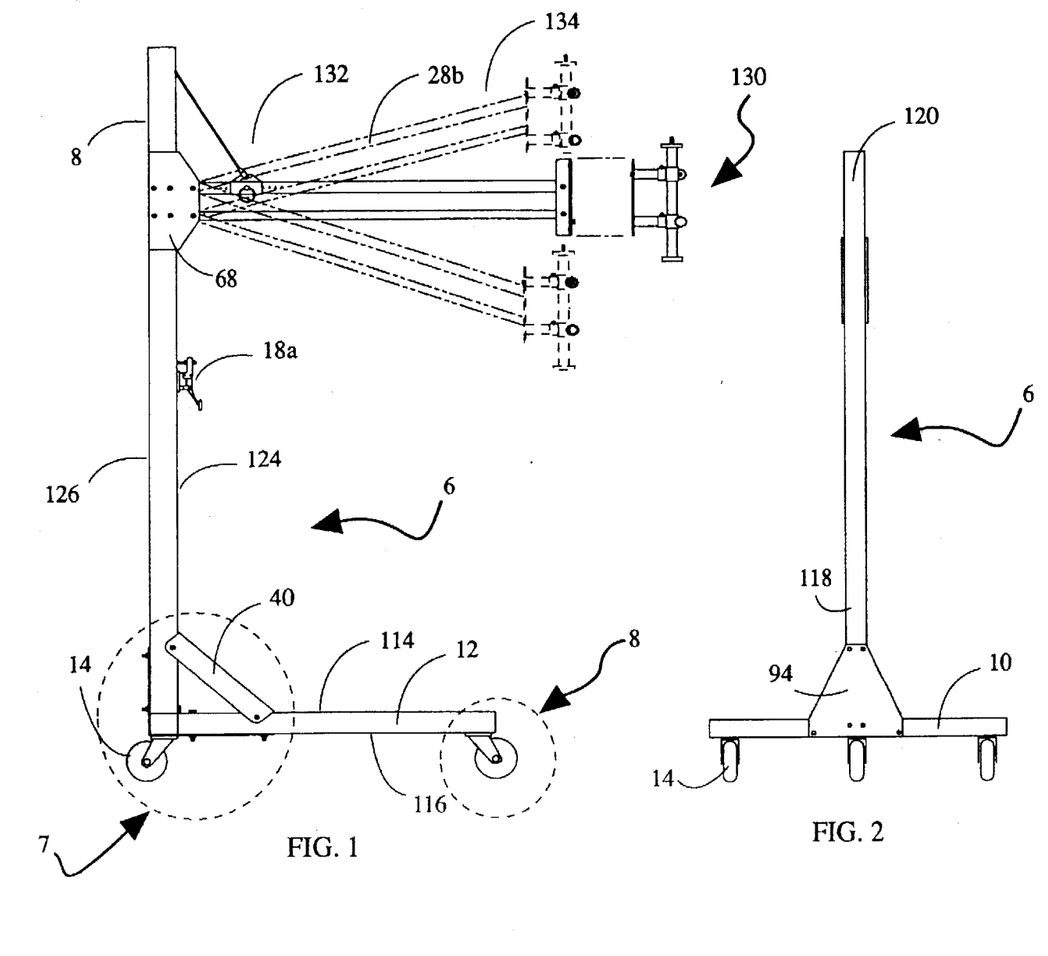
FIG. 1 shows a side view of a stand and parallelogram inner and outer ends.
FIG. 2 shows a rear view of the stand.

FIG. 1 shows an overall side view of the stand 6 with its main components: the column 8; inner and outer sides 124 and 126; the parallelogram 28b; the parallelogram inner and outer ends 132 and 134; the stop means 18a; the channel bracket 40; the front support leg 12; the base top and bottom 114 and 116; wheels 14; side plates 68; and the equipment mounting means 130.

FIG. 2 shows an overall rear view of the stand 6; rear support leg 10; the column upper and lower ends 120 and 118; the rear connector plate 94; and the wheels 14.

Figure 3:
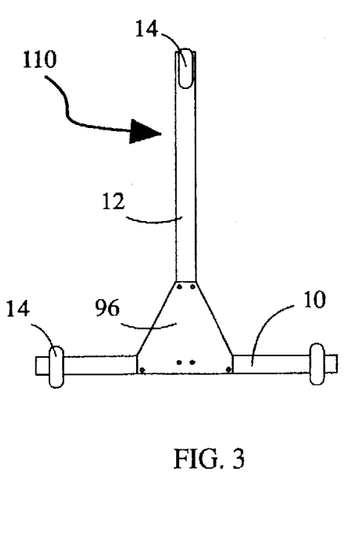
FIG. 3 shows a bottom view of the base of the stand.

FIG. 3 shows an overall bottom view of the base 110, which is made up of the front support leg 12, the rear support leg 10, the wheels 14, and the bottom connector plate 96.

Figure 4:
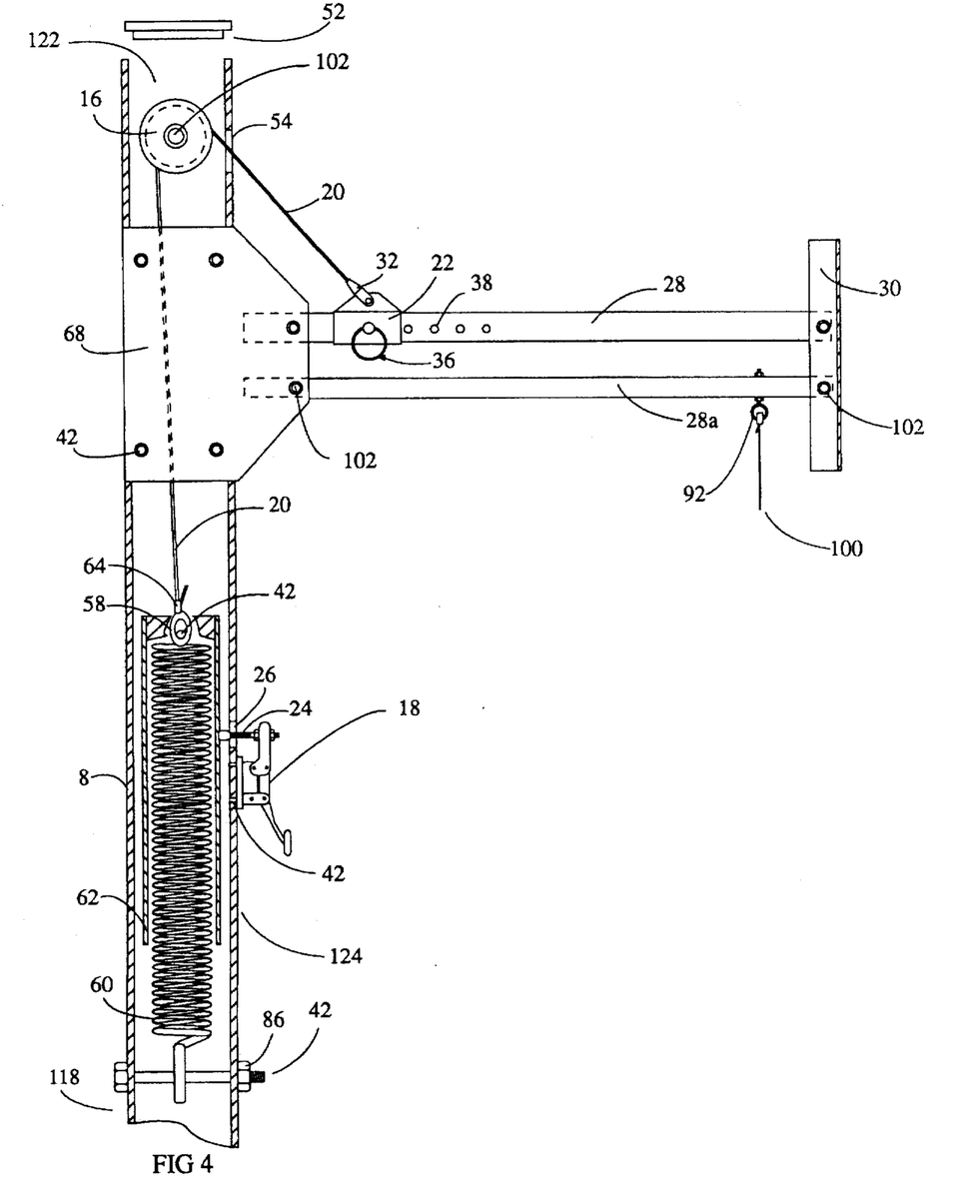
FIG. 4 is a partial cross section of the column of the stand and parallelogram.

FIG. 4 shows a partial cross sectional view of the counter balancing mechanism; the column hollow end 122; and the end cap 52. The spring 60 is attached to the column lower end 118 with fastener 42, and secured with a nut 86. The spring housing 62 is open at the bottom to allow the spring 60 to expand and contract. It is attached at the top to the spring housing 62 with a fastener 42, inserted through both walls of the spring housing 62 through a hole 58. The cable 20 is also attached to the same fastener 42 and secured with a swaged loop-sleeve 64. The cable 20 is then looped over a pulley 16, through an opening 54, and connected to the slider 22 with a pivotable yoke 32. The slider's 22 location is adjustable by moving it along the upper arm 28 and securing it to desired setting by inserting a quick release pin 36 into an appropriate hole 38. The parallelogram upper and lower arms 28 and 28a are connected to the L-brackets 30 and to the side plates 68 with shoulder bolts 102. The side plates 68 are attached to the column 8 with fasteners 42, inserted through the column 8 and threaded into PEM nuts visible in FIG. 6 on the opposite side. The clamp 18 and housing 62 together comprise a stop means 18a which prevents any downward movement of the parallelogram 28b, when clamped down. The prong 24 of the clamp 18 extends through an opening 26 and engages the spring housing 62, preventing further movement. The clamp 18 is mounted to the column inner side 124 by small fasteners 42, which are just long enough to secure it. Safety wire 100 is permanently installed to the lower arm 28a with an eye bolt 92.

Figures 5, 5A, 6:
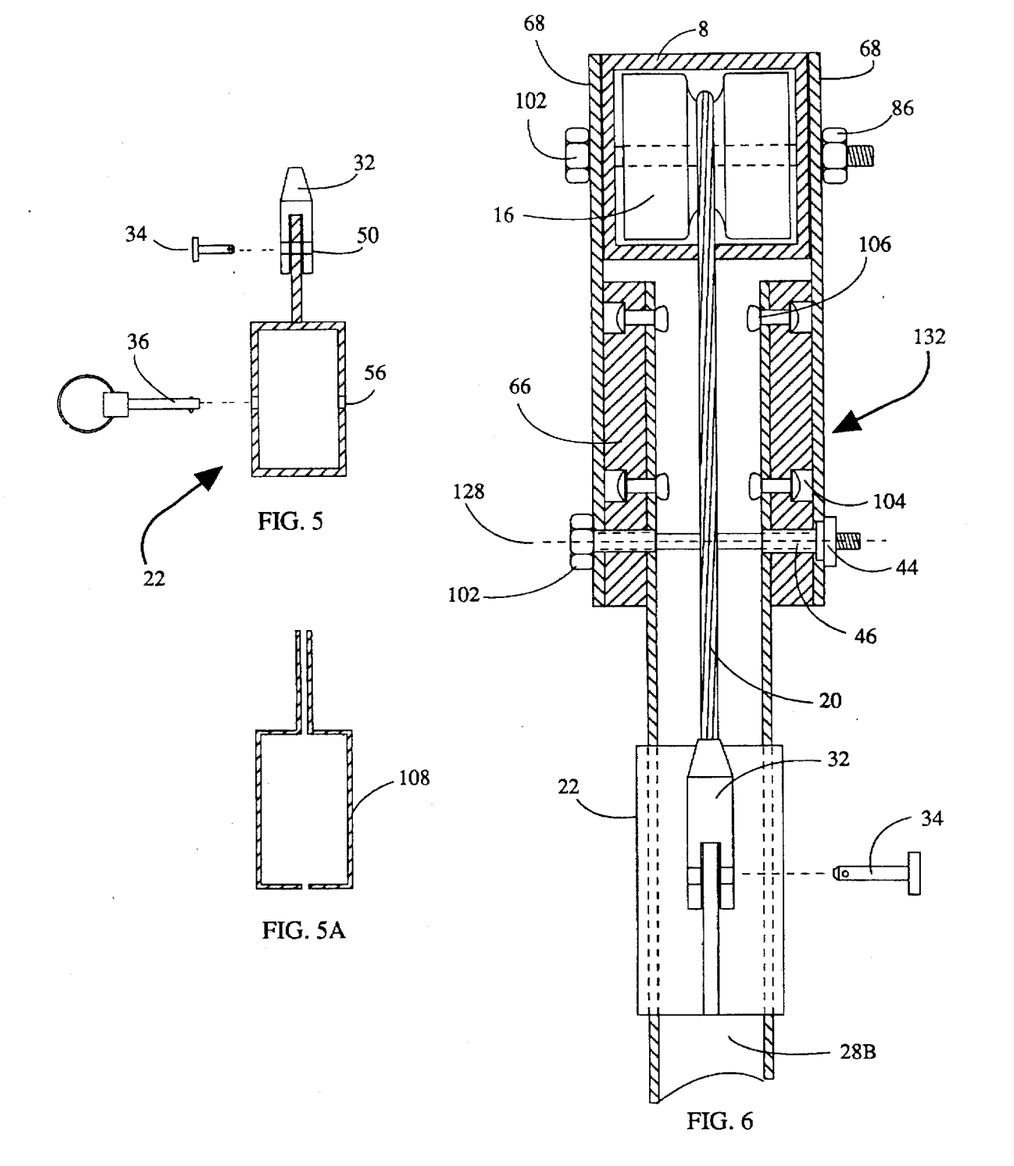
FIG. 5 shows a front view of the slider.
FIG. 5a shows a front view of the slider before spot welding.
FIG. 6 is a partial top cross sectional view of the stand.

FIG. 5 shows a front view of the slider 22, and its components: a yoke 32, a clevis pin 34, a hole 50 for the clevis pin 34, a hole 56 for the quick release pin 36 and a quick release pin 36.

FIG. 5A shows a front view of the slider 22 before the two halves 108 are welded together.

FIG. 6 is a partial cross sectional top view showing the column 8 which houses a pulley 16 secured with and rotating on a shoulder bolt 102 which is threaded into a nut 86 on the opposite side. The friction pads 66 are located substantially behind the pivot point 128, to prevent any sideway play. They are riveted into the parallelogram 28b with rivets 106 which are positioned on the bottom of the countersunk holes 104 to prevent them from scoring against the side plates 68. A shoulder bolt 102 is inserted through the bushings 46 and serves to support the load and form the pivot point 128. The bushings 46 are inserted through the friction pads 66 and through both sides of the parallelogram 28b wall. The wire 20 is swaged into a yoke 32, and attached to the slider 22, with a clevis pin 34.

Figure 7:
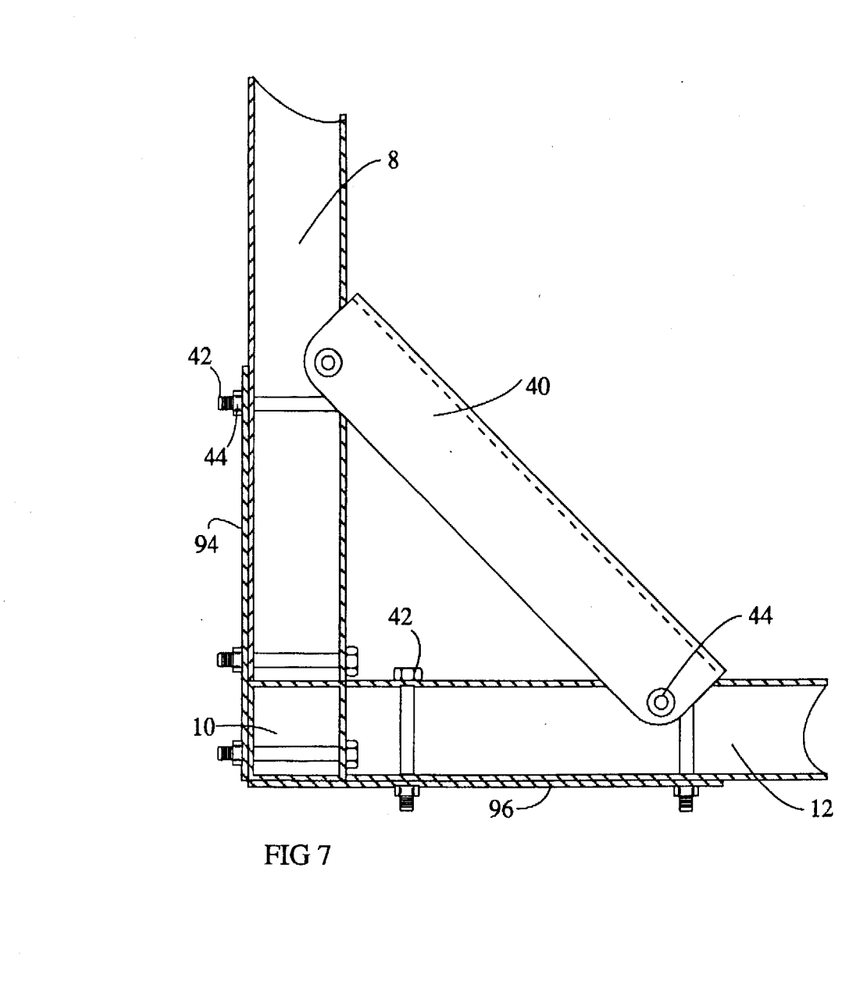
FIG. 7 is a partial cross sectional view of the connection of the column to the base. Shown in circle 7.

FIG. 7 is a partial cross sectional side view showing a channel bracket 40 secured against the column 8 and the front support leg 12. Fasteners 42 are inserted from one side of the bracket 40, through the column 8 and the leg 12, and tightened into the PEM nuts 44 on the opposite side. The rear connector plate 94 is similarly connected to the column 8 and the rear support leg 10. The bottom connector plate 96 connects the front support leg 12 and the rear support leg 10. (See FIGS. 2 and 3, also)

Figure 8:
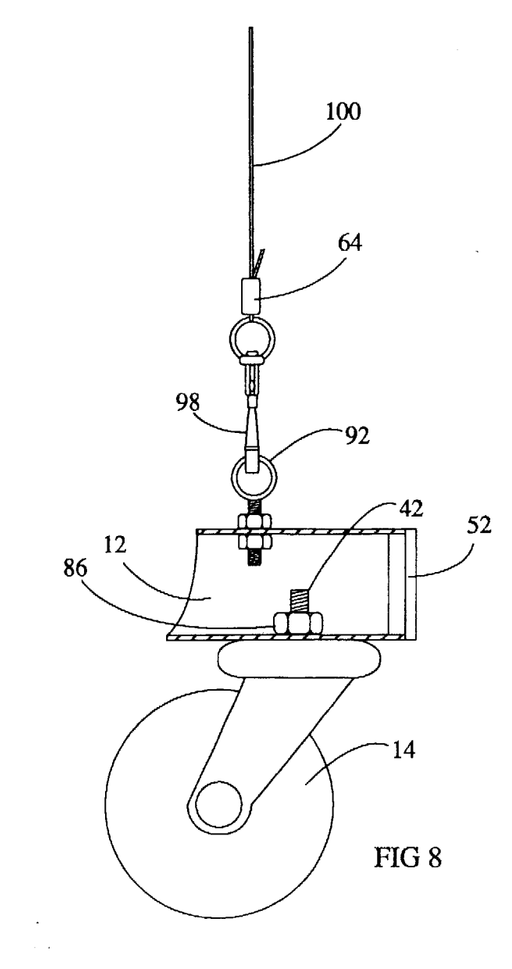
FIG. 8 is a partial cross section of a wheel assembly; a safety wire hook up with a snap; an end cap. Shown in circle 8.

FIG. 8 is a cross sectional side view showing the wheel 14, attached to the front support leg 12 with fastener 42 and nut 86. The safety wire 100 is attached to a safety snap 98 with a swaged sleeve loop 64. The snap 98 is removably attached to an eye bolt 92. When engaged, the safety wire 100 prevents the parallelogram 28b from springing up in case equipment accidentally falls off, while being mounted or dismounted. End cap 52 covers the end of the front support leg 12.

Figure 9:
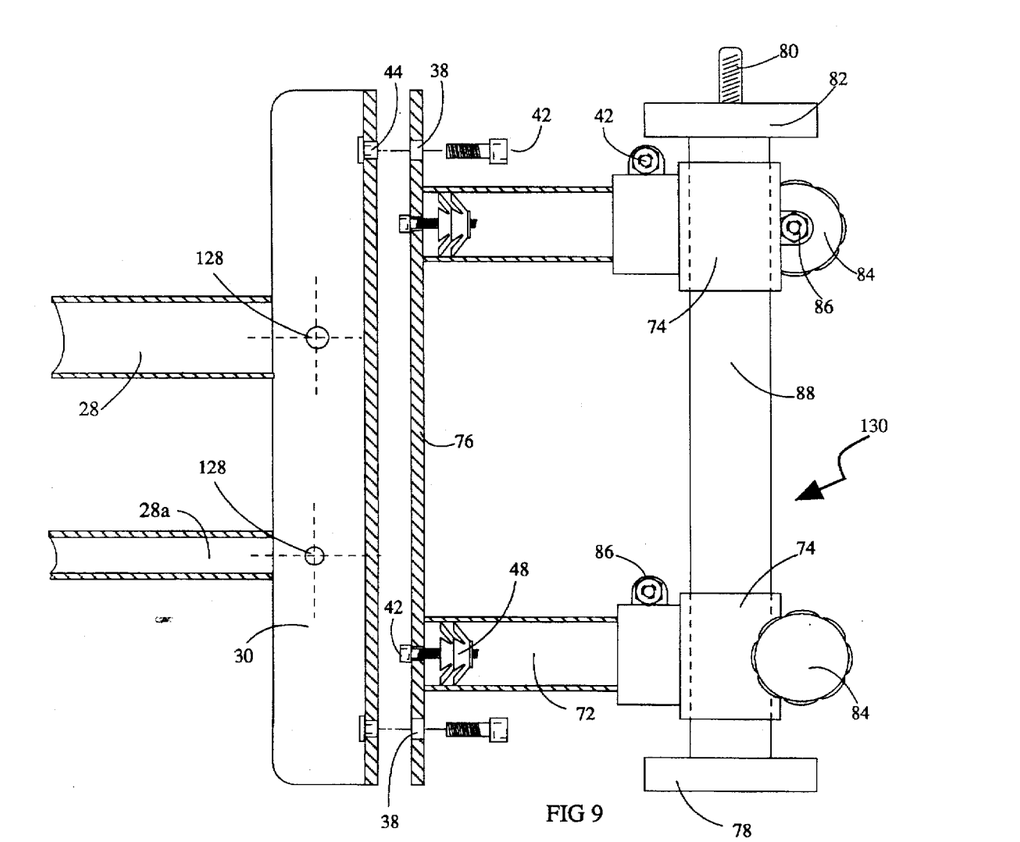
FIG. 9 is a cross sectional side view of a preferred equipment mounting means.

FIG. 9 is a partial cross sectional side view of the preferred equipment mounting means 130. Upper and lower arms 28 and 28a swing at pivot points 128, indicated with dotted crosses, where the L-brackets 30 are connected. See FIG. 6, also. The tube connectors 48 secure the round extension tubes 72 to the equipment mounting plate 76. The mounting plate 76 is connected to the L-brackets 30 with fasteners 42, which are inserted through holes 38 and threaded into the PEM nuts 44, on the L-brackets 30. The opposite ends of the extension tubes 72 are secured into a pair of T-connectors 74 with fasteners 42 and nuts 86. A rotator tube 88 transverses vertically inside the T-connectors 74 and may be secured at a desired setting with an adjustment knob 84. A threaded stud 80 is used to secure a commercial mount or similar (user supplied) camera adapter against the top of a camera mounting platform 82. An accessory mounting platform 78, on the opposite end of the rotator tube 88, may be custom machined to accept various accessories.

Figure 10:
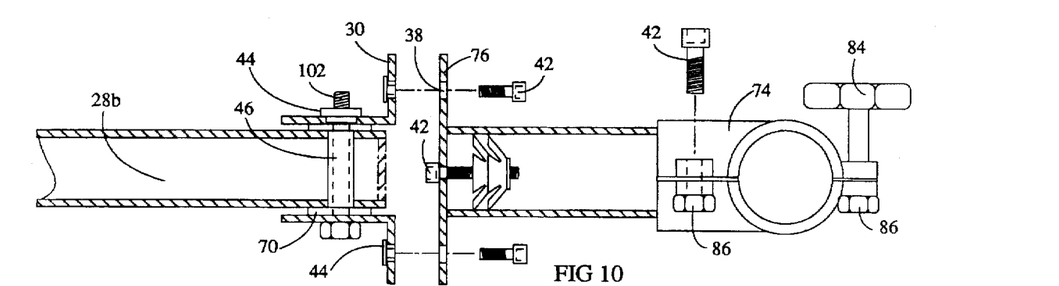
FIG. 10 is a cross sectional top view of of a preferred equipment mounting means.

FIG. 10 is a partial top cross-sectional view revealing a method of connecting the equipment mounting means 130 to the L-brackets 30. The equipment mounting plate 76 is connected to the L-bracket 30 with fasteners 42, inserted through holes 38, and threaded into the PEM nuts 44. Shown is a top of the T-connector 74; the adjustment knob 84; a pair of the L-brackets 30 side by side; a pair of washers 70; and a bushing 46. On the parallelogram side 28b, the shoulder bolt 102 is inserted through the washer 70, the bushing 46, the opposite-side washer 70, and threaded into the PEM nut 44 on the opposite L-bracket 30.

Equipment can be mounted on the mounting means 130. For example a camera may be mounted individually or in combination with a light. When combined, they maintain the same relationship to each other, regardless of the parallelogram's 28b position. In many instances, it is desirable to mount two identical cameras on top of each other in order to use black and white film with one and color film with the other. When used in this fashion, the cameras can be aligned to the same focus and alternated quickly. Varying weights are easily balanced by positioning the slider 22 over appropriate hole 38 on the upper arm 28 and securing the connection with the quick release pin 36. To make the adjustment, the parallelogram 28b is raised until there is no load on the spring 60 and the wire 20 slackens, the slider 22 can then be adjusted to a desired location and secured with the quick release pin 36. Moving the slider toward the parallelogram's 28b outer end 134, a heavier load can be supported; conversely, when moved closer to the inner end 132, lighter loads can be balanced.

The spring 60 is housed within a spring housing 62. The top end of the spring 60 and the lower end of the wire 20, are connected at the top of the spring housing 62 by the same clevis pin 34. When a load is placed at the mounting means 130, the wire 20 pulls the spring 60 along with the spring housing 62. The purpose of the spring housing 62 is to provide a convenient means for checking the movement of the parallelogram 28b at a desired setting. This is accomplished with a toggle clamp 18 mounted to the column 8. An opening 26 enables the clamp's prong 24 to make contact with the spring housing 62. When clamped down, the spring housing 62 is locked in place thus maintaining a desired setting.

The base 110 is formed by connecting the rear support leg 10 and the front support leg 12 to a bottom connector plate 96, with fasteners 42. Wheels 14 are secured with fasteners 42 and nuts 86; the wheels should preferably have locking mechanism. See FIGS. 1 thru 3.

The column 8 is connected to the base 110 with a rear connector plate 94 and a channel bracket 40. See FIG. 7 for details.

The pads 66 are riveted to the parallelogram arms 28 and 28a with blind rivets 106 near the inner end 132, as shown in FIG. 6. The rivet heads are recessed in countersunk holes 104 to prevent scoring the side plates 68. Most of the pads 66 are located behind the pivot point 128, and serve to prevent any sideway play of the parallelogram 28b.

On the outer end 134, the arms 28 and 28a are pivotally connected to the L-brackets 30 with a shoulder bolts 102, which pivots on a load bearing bushings 46. Two washers 70 are sandwiched between the L-brackets 30 and the arms 28 and 28a to prevent scoring. The yoke 32 is swaged onto the wire 20 and attached to the slider 22 with a clevis pin 34. See FIGS. 6, 9 and 10.

The slider 22 is made of sheet metal in two halves 108 which are spot welded together. A hole 56 is drilled through both walls of the slider 22 for a quick release pin 36. Several matching holes 38 are drilled along the upper arm 28 for connecting the slider 22 to the arm 28. When the quick release pin 36 is inserted through the holes 56 in the slider 22, and through the holes 38 on the arm 28, a secure connection is made. See FIGS. 4 and 6.

The toggle clamp 18 locks the spring housing 62 to a desired setting. When clamped down, the prong 24 extends though an opening 26 on the column 8, and presses against the spring housing 62 preventing further vertical movement. The toggle clamp 18 is mounted to the column 8 with fasteners 42, which are just long enough to secure it without interfering with the traversing action of the spring housing 62. See FIG. 4.

Equipment mounting means 130 is made up by connecting the two extension tubes 72 to an equipment mounting plate 76 with a tube connectors 48. The T-connectors 74 secure the opposite ends of the tubes with fasteners 42 and nuts 86. A rotator tube 88 is inserted into the T-connectors 74, enabling it to traverse vertically. Adjustment knobs 84 secure a desired setting. A camera mounting stud 80 connects a (customer supplied) mount which rests on a camera mounting platform 82. An optional accessory mounting platform 78 at the other end of the rotator tube 88 can be machined to accept various accessories. The mounting means 130 may be rotated and mounted upside down, if needed. Equipment mounting plate 76 connects the mounting means 130 to the L-brackets 30 with fasteners 42. See FIGS. 9 and 10. In addition to the preferred mounting means cited here, other designs for mounting equipment may be connected to the L-brackets 30.

A safety wire 100 prevents the parallelogram 28b from snapping up should a camera or a light fall off accidentally, while being mounted or dismounted. It is permanently mounted to an eye bolt 92 at underside of arm 28a and extends to the eye bolt 92 at the front support leg 12. A snap 98 secures the wire 100 to the eye bolt at the leg 12. When not needed the safety wire 100 is disconnected with the snap 98. See FIGS. 4 and 8.

Accordingly the objects and advantages of this invention are:

To provide a stand 6, equipped with wheels 14 and a boom arm 28b, used for balancing and supporting a variety of equipment such as cameras, lights, industrial, and medical devices. The use of internal spring 60 counterbalance eliminates the need for external counterweights, such as sand bags, or any other external projections past the column's 8 outer side 126. Thus the unit can be placed against a wall, a desirable feature for small studios with a limited floor space. Furthermore, the above balancing apparatus has the additional advantages in that a) it allows the cameras or the lights to be placed away from the column 8, directly over the area to be photographed or illuminated, leaving ample room between the vertical column 8 and the subject;

b) once the desired setting is accomplished, the parallelogram 28b can be be locked in place;

c) it eliminates the cumbersome steps, typical when using standard tripod, of unfastening and adjusting the equipment, and then refastening the new settings;

d) once adjusted for the load, the spring 60 makes it effortless to lift or lower the equipment;

The above description covers, in general terms, the present invention without limiting the full scope of the invention to these specifics. For example, although generally referred to as a camera or a light support system, the invention is equally suitable for supporting industrial and medical devices and the like.

Reference Numerals In Drawings

6 Stand
8 Column
10 Rear support leg
12 Front support leg
14 Wheels
16 Pulley
18 Clamp
18a Stop means
20 Wire
22 Slider
24 Prong
26 Opening for clamp prong
28 Upper arm
28a Lower arm
28b Parallelogram
30 L-brackets
32 Yoke
34 Clevis pin
36 Quick release pin
38 Hole—generic
40 Channel Bracket
42 Fasteners
44 Self clinching nuts, referred throughout as PEM nuts
46 Bushings
48 Tube connectors
50 Hole for clevis pin
52 End caps
54 Opening for wire
56 Hole for quick release pin
60 Spring
62 Spring housing
64 Loop sleeve
66 Pads
68 Side plates
70 Washer
72 Extension tube
74 T-connector
76 Equipment mounting plate
78 Accessory mounting platform
80 Camera mounting stud
82 Camera mounting platform
84 Adjustment knob
86 Nut, generic
88 Rotator tube
92 Eye bolt
94 Rear connector plate
96 Bottom connector plate
98 Snap for safety wire
100 Safety wire
102 Shoulder bolt
104 Countersink
106 Rivets
108 Slider before spot welding
110 Base
114 Base, top
116 Base, bottom
118 Column, lower end
120 Column, upper end
122 Column, hollow end
124 Column, inner side
126 Column, outer side
128 Pivot point
130 Equipment mounting means
132 Parallelogram, inner end
134 Parallelogram, outer end The improved apparatus for counterbalancing equipment 6 has been described with reference to a particular embodiment. However, it should be obvious to those skilled in the art, to which this invention pertains, that other modifications and enhancements can be made without departing from the spirit and scope of the claims that follow.

What is claimed is:

1. An apparatus for counterbalancing equipment comprising:
   a. a base having a top and a bottom;
   b. a wheel attached to said bottom;
   c. a column having an upper and lower end; said column being hollow and attached at said lower end to said top;
   d. a parallelogram having an inner end and an outer end; said parallelogram being pivotally attached to said column means at said inner end, adjacent to said upper end;
   e. an equipment mounting means for mounting said equipment on said outer end;
   f. a slider adjustably attached to said parallelogram;
   g. a spring, fasten to and contained within said column;
   h. a pulley located within said column at said upper end; said column being adapted for external access to said pulley;
   i. a wire connecting said slider to said spring over said pulley;
   j. a stop means for preventing and allowing vertical translation of said equipment mounting means; and
   k. a safety means for preventing sudden upward motion of said equipment mounting means in case equipment accidentally falls off.

2. The counterbalancing apparatus as claimed in claim 1 in which said stop means comprises:
   a. a housing fixed to said spring, which contains most of said spring without interfering with the ability of said spring to elongate and contract;
   b. a clamp, attached to said column, capable of applying pressure on said housing; whereby elongation and contraction of said spring can be prevented and allowed.

3. The counterbalancing apparatus as claimed in claim 1 in which said safety means comprises a cable connected to said parallelogram and connected to and disconnected from said base.

4. The counterbalancing apparatus as claimed in claim 1 in which said equipment mounting means includes a means for mounting equipment.

5. The counterbalancing apparatus as claimed in claim 1 further including a quick release means for releasably attaching said slider to said parallelogram.

6. An apparatus for counterbalancing equipment comprising:
   a. a stand having a hollow, vertical support column;
   b. a translation means, attached to said stand for permitting horizontal translation of said stand;
   c. a parallelogram having an inner end and an outer end; said parallelogram being pivotally attached to said vertical support column at said inner end;
   d. an equipment mounting means for mounting said equipment on said end;
   e. a counterbalancing means, contained within said vertical support column, for applying counterbalancing loads;
   f. a stop means for preventing and allowing vertical translation of said equipment mounting means;
   g. a safety means for preventing sudden upwards motion of said equipment in case equipment falls off; and
   h. a means for attaching said parallelogram to said counterbalancing means.

7. The counterbalancing apparatus as claimed in claim 6 in which said equipment mounting means includes a means for mounting a camera.

* * * * *